(12) United States Patent
Ganguly et al.

(10) Patent No.: US 9,576,262 B2
(45) Date of Patent: Feb. 21, 2017

(54) SELF LEARNING ADAPTIVE MODELING SYSTEM

(71) Applicant: Microsoft Corporation, Redmond, WA (US)

(72) Inventors: Sandipan Ganguly, Bothell, WA (US); Lu Xia, Shanghai (CN); Weiwei Wu, Bellevue, WA (US); Shoou-Jiun Wang, Redmond, WA (US); Justin Hobart, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 219 days.

(21) Appl. No.: 13/706,318

(22) Filed: Dec. 5, 2012

(65) Prior Publication Data
US 2014/0156568 A1    Jun. 5, 2014

(51) Int. Cl.
*G06F 15/18* (2006.01)
*G06Q 10/06* (2012.01)
*G06N 99/00* (2010.01)
*G06K 9/62* (2006.01)
*G06N 5/02* (2006.01)
*G06N 7/00* (2006.01)

(52) U.S. Cl.
CPC ........ *G06Q 10/0637* (2013.01); *G06Q 10/067* (2013.01); *G06Q 10/06375* (2013.01); *G06K 9/6256* (2013.01); *G06K 9/6269* (2013.01); *G06N 5/025* (2013.01); *G06N 7/005* (2013.01); *G06N 99/005* (2013.01)

(58) Field of Classification Search
None
See application file for complete search history.

(56) References Cited

U.S. PATENT DOCUMENTS

| 5,819,226 A * | 10/1998 | Gopinathan | G06Q 20/00 705/44 |
| 6,714,918 B2 | 3/2004 | Hillmer et al. | |
| 7,693,767 B2 | 4/2010 | Petriuc | |
| 7,788,195 B1 * | 8/2010 | Subramanian | G06N 99/005 706/20 |
| 7,933,762 B2 * | 4/2011 | Pinto | G05B 17/02 703/22 |

(Continued)

OTHER PUBLICATIONS

"Fraud Detection", Retrieved at <<http://www.statsoft.com/textbook/fraud-detection/>>, Apr. 8, 2010, pp. 5.

*Primary Examiner* — Kakali Chaki
*Assistant Examiner* — Ababacar Seck
(74) *Attorney, Agent, or Firm* — Dan Choi; Micky Minhas (57) ABSTRACT

Self-learning and adaptive modeling is employed with respect to predictive analytics. A hierarchical model structure can be employed comprising a set of predictive models automatically built from accumulated data and distributed across multiple levels. For a given input type, a set of candidate models can be identified across varying levels of granularity, and a best model selected based on a comparison of performance metrics of the models. The best model can then be activated for use in making predictions. Of course, the best model can change based on most recent training performance results, since as more data becomes available more specific models can be developed.

20 Claims, 6 Drawing Sheets (56) References Cited

U.S. PATENT DOCUMENTS

| | | | |
|---|---|---|---|
| 7,949,639 B2* | 5/2011 | Hunt | G06Q 30/02 707/688 |
| 7,970,701 B2 | 6/2011 | Lewis et al. | |
| 7,991,689 B1 | 8/2011 | Brunzell et al. | |
| 8,595,154 B2* | 11/2013 | Breckenridge | G06N 99/005 706/12 |
| 2004/0030667 A1* | 2/2004 | Xu | G06Q 40/08 |
| 2004/0249482 A1* | 12/2004 | Abu El Ata et al. | 700/44 |
| 2007/0244738 A1 | 10/2007 | Chowdhary et al. | |
| 2008/0306895 A1* | 12/2008 | Karty | G06Q 10/04 706/52 |
| 2009/0030864 A1* | 1/2009 | Pednault | G06F 17/30539 706/45 |
| 2009/0106178 A1* | 4/2009 | Chu | G06N 99/005 706/14 |
| 2009/0307028 A1* | 12/2009 | Eldon | G06Q 20/12 705/37 |

\* cited by examiner

SELF LEARNING ADAPTIVE MODELING SYSTEM

BACKGROUND

Predictive models or algorithms are employed to predict the likelihood of an outcome. One application of predictive models is in risk assessment. Most enterprises in e-commerce and financial industries use some form of predictive models to detect fraud and intrusion in their transaction system. For example, fraud can include conducting unauthorized business on someone else's payment instrument. A decision scientist or statistician is conventionally employed to build a predictive model to identify high-risk behavior. Model performance is periodically monitored, and the model is re-developed when the performance level falls below a predetermined level. Further, sophisticated models are often designed to improve classification based on an abundance of historical data. For instance, a model can be trained to classify behavior has high or low risk as a function of historical data for a particular business.

SUMMARY

The following presents a simplified summary in order to provide a basic understanding of some aspects of the disclosed subject matter. This summary is not an extensive overview. It is not intended to identify key/critical elements or to delineate the scope of the claimed subject matter. Its sole purpose is to present some concepts in a simplified form as a prelude to the more detailed description that is presented later.

Briefly described, the subject disclosure pertains to a self-learning and adaptive modeling system. Predictive models can be developed and tuned automatically based on accumulated data. Further, a current predictive model, used to make predictions, can be updated or replaced with a newly developed or tuned model automatically without manual intervention.

In accordance with one aspect of this disclosure, a hierarchical modeling structure can be employed comprising a set of predictive models distributed across a plurality of hierarchical levels of varying granularity, for example from generic to specific. Accordingly, several models may exist and be applicable to making a particular prediction. Here, a candidate set of predictive models can be identified, the performance of each predictive model determined, and a best model selected based on a performance comparison. This best performing model can subsequently be activated for use in making predictions dynamically at run time.

To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the claimed subject matter. Other advantages and novel features may become apparent from the following detailed description when considered in conjunction with the drawings.

DETAILED DESCRIPTION

Statisticians typically create a predictive model, or, in other words, predictive algorithms, manually in a process that can take many weeks. Once put in place, a model's predicative capability can degrade quickly based on changes independent of the model. Consider a risk mitigation, or fraud detection, model, for example. Once one type of fraud is identified and stopped, fraudsters rapidly adapt and employ new techniques. As a result, resources must be made available to re-develop or tweak the model frequently. Often, however, the model cannot be re-developed frequently enough because of a lack of required resources (e.g., people, time . . . ).

Some models can be built and re-trained automatically. Here, training is dependent on the availability of a large amount of historical data to build an initial model. However, adequate amounts of historical data are often unavailable, for instance with respect to a new business or product.

Details below are generally directed toward a self-learning and adaptive modeling system (SLAMS). A predictive model can be developed automatically. Moreover, a predictive model can self-learn changes in patterns by way of automatic re-training of the model in view of recent data. Subsequently, the re-trained model can be automatically deployed for use in predicting an outcome. Consequently, the predictive modeling system is accurate, dynamic, and cost efficient.

In accordance with one particular aspect, a hierarchical structure can be employed comprising a set of predictive models distributed across hierarchical levels, for example from generic to specific depending on the amount of data available. A candidate set of models across the hierarchy can be identified for a particular input, or type of input, and a best model can be determined based on a comparison of performance of each candidate model. The best model can then activated for use with respect to real-time decision making. Further, data can be collected with respect to decision input and utilized to re-train or re-develop data models as well as develop new models.

In accordance with another aspect, at least a portion of the subject modeling system can be deployed as a web-based service or the like (e.g., network, cloud . . . ), to provide predictive analytics to a wide variety of businesses or other users. In this scenario, generic models built based on data from other users can be exploited by a new user, for instance. Accordingly, new users can avail themselves of predictive analytics without providing an abundance of historical data.

Various aspects of the subject disclosure are now described in more detail with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents, and alternatives falling within the spirit and scope of the claimed subject matter.

Figure 1:
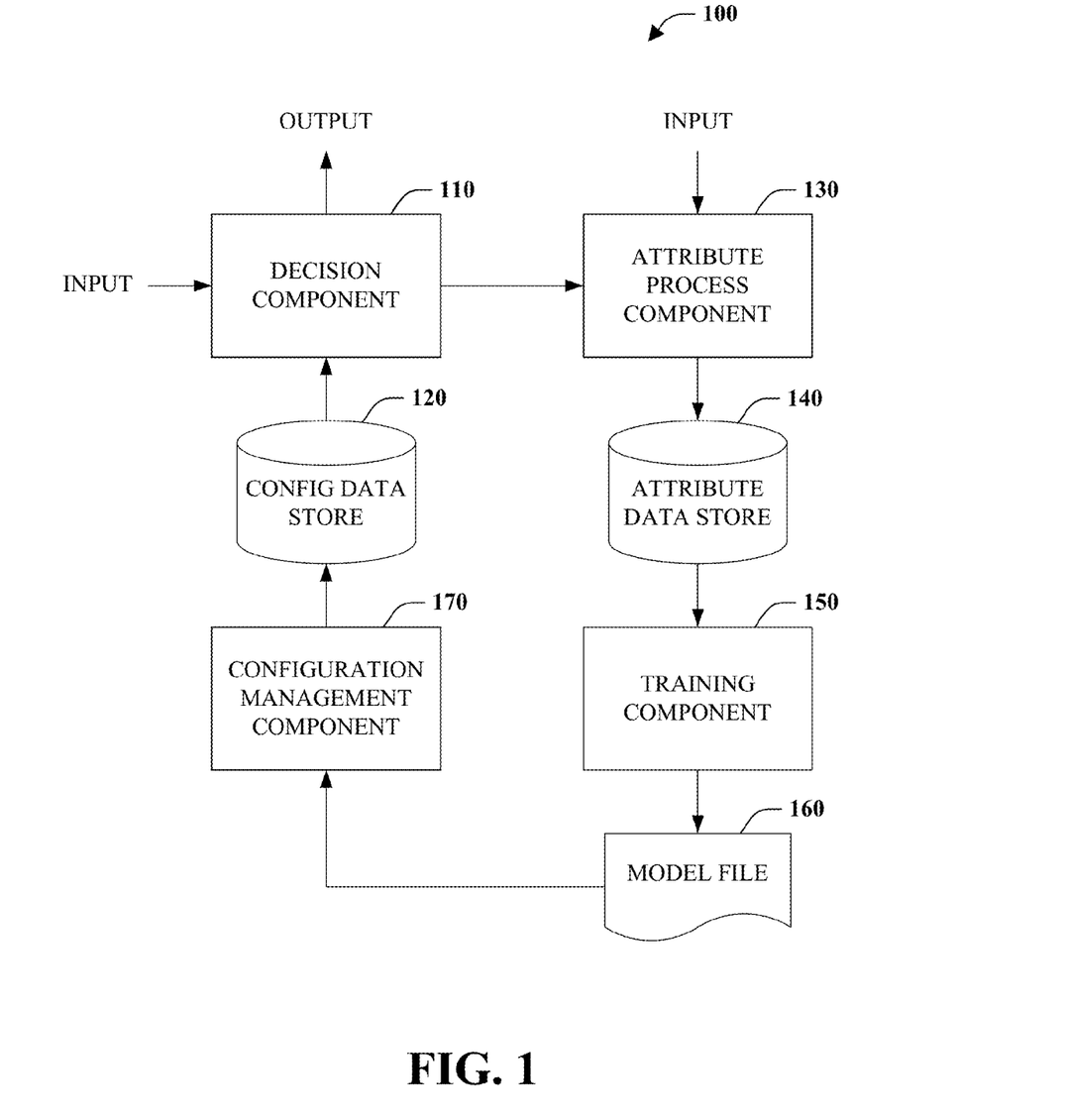
FIG. 1 is a block diagram of a modeling system.

Referring initially to FIG. 1, a modeling system 100 is illustrated. The system 100 includes a decision component 110 configured to make decisions. More specifically, the decision component 110 is configured to predict or infer the likelihood, or probability, of an outcome given some input as a function of a predictive model or set of predictive algorithms. The predictive model, which can employ any number of statistical or machine learning techniques (e.g., linear regression, logistic regression, neural networks, support vector machines . . . ), among others, can be acquired from a configuration data store 120 that persistently saves data for employment by the decision component 110. The decision component 110 can employ predictive analytics with respect to a number of different applications. By way of example, given a transaction as input and a corresponding model, the decision component 110 can predict whether the transaction is fraudulent (e.g., credit, insurance, tax . . . ). As another example, the decision component 110 can predict whether a customer is likely to be cross-sold an additional product. Of course, the modeling system 100 is not limited to the example applications and in fact can support substantially any application of predictive analytics.

Attribute process component 130 is configured to acquire attributes associated with an input and save them to a persistent store such as attribute data store 140. Attributes correspond to data associated with input to the decision component 110. In the context of fraud detection, a transaction can correspond to a purchase or adding a credit card account to a system, among other things. Attributes can correspond to transaction details such as the IP (Internet Protocol) address of a user and/or a device identifier (ID), among other things, provided with input. In other words, attributes are data associated with a particular activity such as a transaction. In addition to accepting passed information, the attribute process component 130 is also configured to derive additional attributes from provided attributes. For instance, from an IP address, the country that a transaction originated in can be determined. Furthermore, velocities such as the number of purchases made the last few days or the number of credit cards added in the last few days can be determined. Optionally, attributes can also be defined manually and provided to the attribute process component 130. The saved attributes provide a basis for model training.

Training component 150 can utilize data saved to the attribute data store 140 to develop and train predictive models. The output of the training component 150 is a model or more specifically a model file 160 comprising one or more models or predictive algorithms associated with models.

Figure 2:
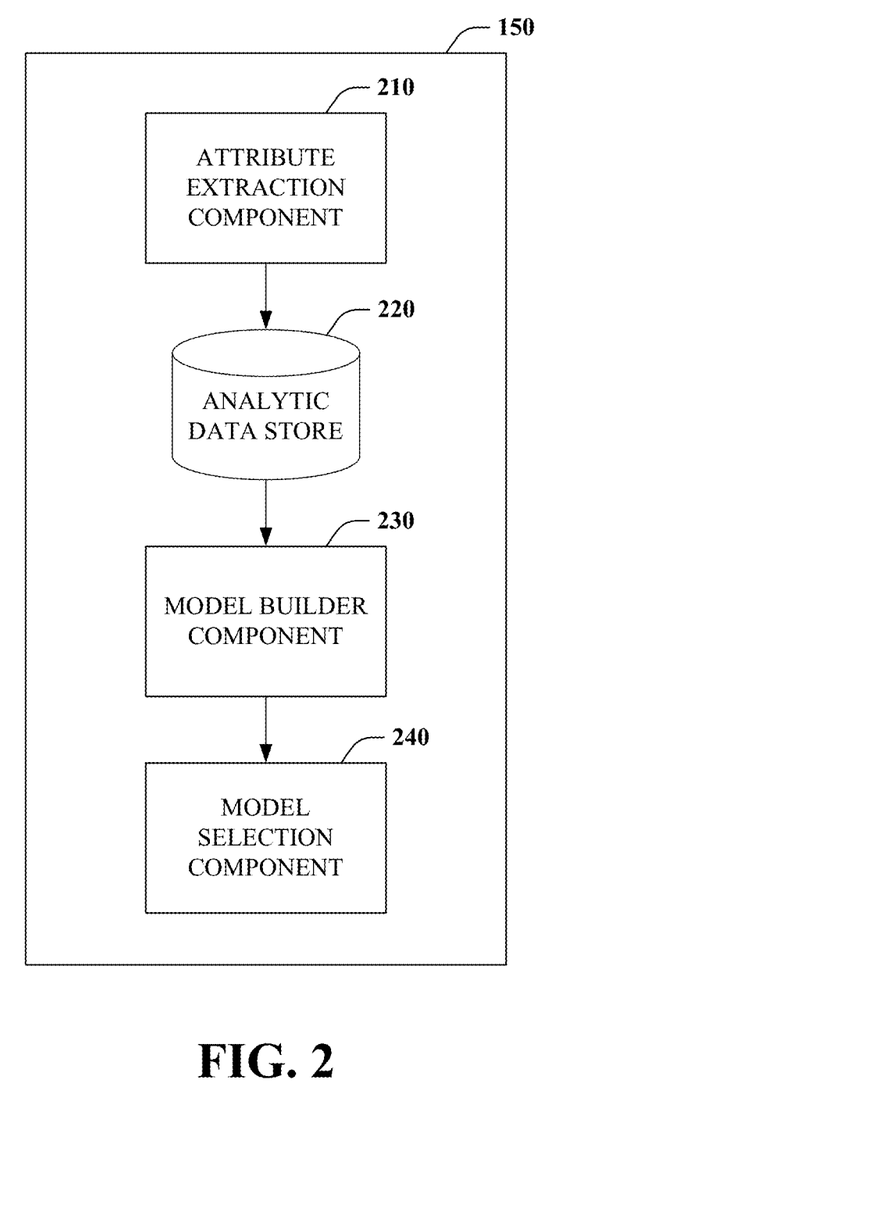
FIG. 2 is a block diagram of a representative training component.

FIG. 2 illustrates a representative training component 150 in further detail. The training component 150 includes an attribute extraction component 210 configured to extract attributes from the attribute data store 140. Extracted attributes, among other things, can be saved locally to analytic store 220. Model builder component 230 is configured to build or, in other words, train (or re-train), one or more models based on the attributes as well as confirmed cases of that which is to be predicted (e.g., fraud). In one implementation, data mining techniques can be employed by the model builder component 230 over large quantities of attribute data to discover patterns and facilitate model building.

In accordance with one embodiment, the model builder component 230 can be configured to generate a hierarchical model structure comprising a set of predictive models segmented across a plurality of levels. In this scenario, model selection component 240 can be employed to identify one of the set of predictive models to output as the model file 160, for example. More specifically, the model selection component 240 can be configured to identify a set of candidate predictive models for a type of input and analyze the performance of the set of candidate models. The model that outperforms other models can subsequently be selected.

Figure 3:
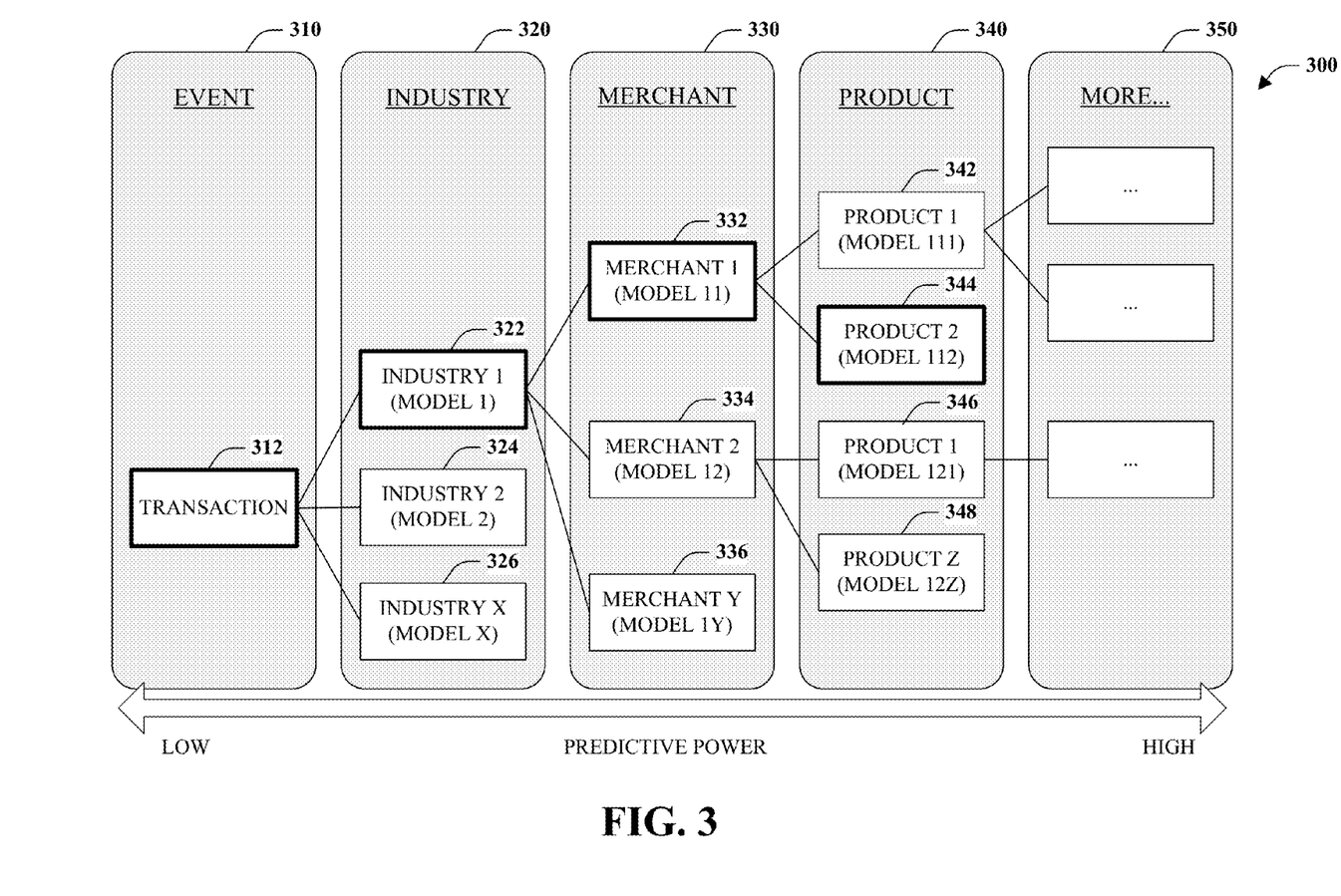
FIG. 3 is a block diagram of an exemplary hierarchical model structure.

FIG. 3 depicts a representative hierarchical model structure 300 to facilitate clarity and understanding. The structure 300 includes five hierarchical levels of increasing granular or specificity from left to right. Thus, the predictive power of a model increases from left to right. The hierarchical model structure 300 can distribute a set of models across each level linked as a tree, for instance, such that a model can include one or more children and/or ancestors (e.g., parent, grandparent . . . ).

As shown, the structure 300 includes event level 310, industry level 320, merchant level 330, and product level 340. The event level 310 corresponds to a type of input upon which predictions are made. For the event level 310, a single "Transaction" model 312 exists to aid predictions regarding accessing risks associated with business transactions, for example. The industry level 320 provides models for several different industries, namely "Industry 1" 322, "Industry 2" 324, and "Industry X" 326, where "X" is an integer greater than two. Exemplary industries could include entertainment, consumer goods, and finance. The merchant level 330 further provides models for specific merchants, such as storeowners, in a given industry including "Merchant 1" 332, "Merchant 2" 334, and "Merchant Y" 336, where "Y" is an integer greater than two. The product level 340 provides models for products of particular merchants. Here, there are two models for products of "Merchant 1" 332, "Product 1" 342 and "Product 2" 344, and at least two product models for "Merchant 2" 334, "Product 1" 346 and "Product Z" 348, where "Z" is an integer greater than one. Additional levels including models that are even more specific can also be available as illustrated by more level 350. For example, an addition level could correspond to particular payment methods such as credit card, invoice, or PayPal®. As another example, an additional level can be related to a geographic region. Not only is it possible to add levels at the end of the hierarchy but also possible to insert one or more levels between existing hierarchical levels. For instance, if data indicates that there needs to a level between the industry level 320 and the merchant level 330, the additional level can be added without breaking the system.

Where there is little or no historical data available, the most generic model can be employed. Here, that model is the "Transaction" model 312. As more data flows into the system, the transaction model can be re-trained or tuned for recent data. Additionally, models that are more specific can be developed and trained. Accordingly, as data accumulates over time, models can morph into custom models for a specific business and product, for example. At any given time, however, one relevant model may outperform another model, which might not be the most specific model where there is not enough data to produce a mature specific model. Care can be taken to measure model performance to ensure that the best, or top, performing model is employed, or activated, regardless of level.

For an input, a set of candidate models can be identified that pertain to the input. For example, the input can correspond to a transaction in industry 1, merchant 1, and product 2. The set of candidate models can thus include "Transaction" model 312, "Industry 1" model 322, "Merchant 1" model 332, and "Product 2" model 344. One or more performance metrics can be determined for each model based on how well a model performs with respect to training data (known cases associated with a prediction), and used to compare models. The model that performs best, as measured by the one or more performance metrics, can be selected for use. In one instance where there is no data regarding a particular product, a model high up in the hierarchy, namely a merchant model can be employed.

The hierarchical structured model is conducive to employment of the modeling system as a service on a platform or as part of a hosted marketplace (e.g., buyer/seller platform), for instance. Where a new business is on boarded with no historical data, a model can be utilized that is developed with data from a similar business. Hence, the modeling system can be business independent and data driven. As more data becomes available, more business specific models can be developed and eventually employed.

For example, if a new merchant seeks to employ predictive analysis, the new merchant need not have an abundance of historical data. Rather, a model can be selected that was developed for the industry of the merchant. Accordingly, the merchant can exploit data input to the system by other merchants in the same industry. Over time, the predictive power of the industry model can increase as data accumulates. Furthermore, a specific data model can be developed for the merchant to provide even higher predictive power eventually. Still further, models can be developed for specific merchant products. Hence, performance increases with time and data.

Returning to FIG. 1, configuration management component 170 is configured to acquire the model file 160 and updated configuration data for the decision component 110 to enable use of the top performing and most up-to-date model. Prior to updating the configuration, the model file can be validated to ensure it is in an acceptable form to prevent unexpected results upstream with respect to predicting the likelihood of an outcome. If the model file is invalid, the configuration management component 170 can reject the model file and perform no further action. If validated, a real-time model can be automatically updated. In one particular embodiment, such an updated process can involve refreshing significant predictive attribute list, updating model type/coefficients, and adjusting risk rejection thresholds. Further, note that there need not be any bound on the number of times fresh models can be updated. Even if there is a minute change in the model, the can be uploaded by the configuration management component 170.

Once updated, the decision component 110 can make use of an up-to-date model. As a result, the decision component 110 is adapted to make decisions in light of recent changes in behavior, for example, reflected by recently collected data. Further, the configuration management component 170 in conjunction with the model file 160 can make more than one relevant data model available for use in a failure situation. For example, if there is a failure with respect to the best model for some reason (e.g., corruption, unavailability . . . ), the decision component can fall back to an ancestor model, for example, with a lower degree of predictive power. Furthermore, while described with respect to a single data model for sake of clarity and understanding, the modeling system 100 can operate with respect to a plurality of models for a plurality of types of input.

In accordance with one embodiment, the training component can operate offline, while the decision component 110, attribute process component 130, and configuration management component 170 operate online. Offline operation allows the training component 150 to employ substantially any model building methodologies and/or algorithms. In this scenario, the training component 150 can make new models available by way of the model file 160 at a particular interval such as, but not limited to daily. Thus, at the beginning of each day, a model can be activated that has been tuned or re-trained with data collected and derived from data of the previous day. In some instances, the data model activated can be a more specific data model where sufficient data has been accumulated to develop a mature model that outperforms models that are more generic.

Note that the modeling system 100 is not dependent on manual intervention and associated costs. For example, once a new business is added or, in other words, onboarded, to the modeling system 100, the modeling system 100 can automatically learn and adapt to changes. Consequently, the modeling system 100 is highly scalable as well as cost efficient.

The aforementioned systems, architectures, environments, and the like have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component to provide aggregate functionality. Communication between systems, components and/or sub-components can be accomplished in accordance with either a push and/or pull model. The components may also interact with one or more other components not specifically described herein for the sake of brevity, but known by those of skill in the art.

Furthermore, various portions of the disclosed systems above and methods below can include or employ of artificial intelligence, machine learning, or knowledge or rule-based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent. By way of example, and not limitation, the training component 150 can employ such mechanisms with respect to predictive model building.

Figure 4:
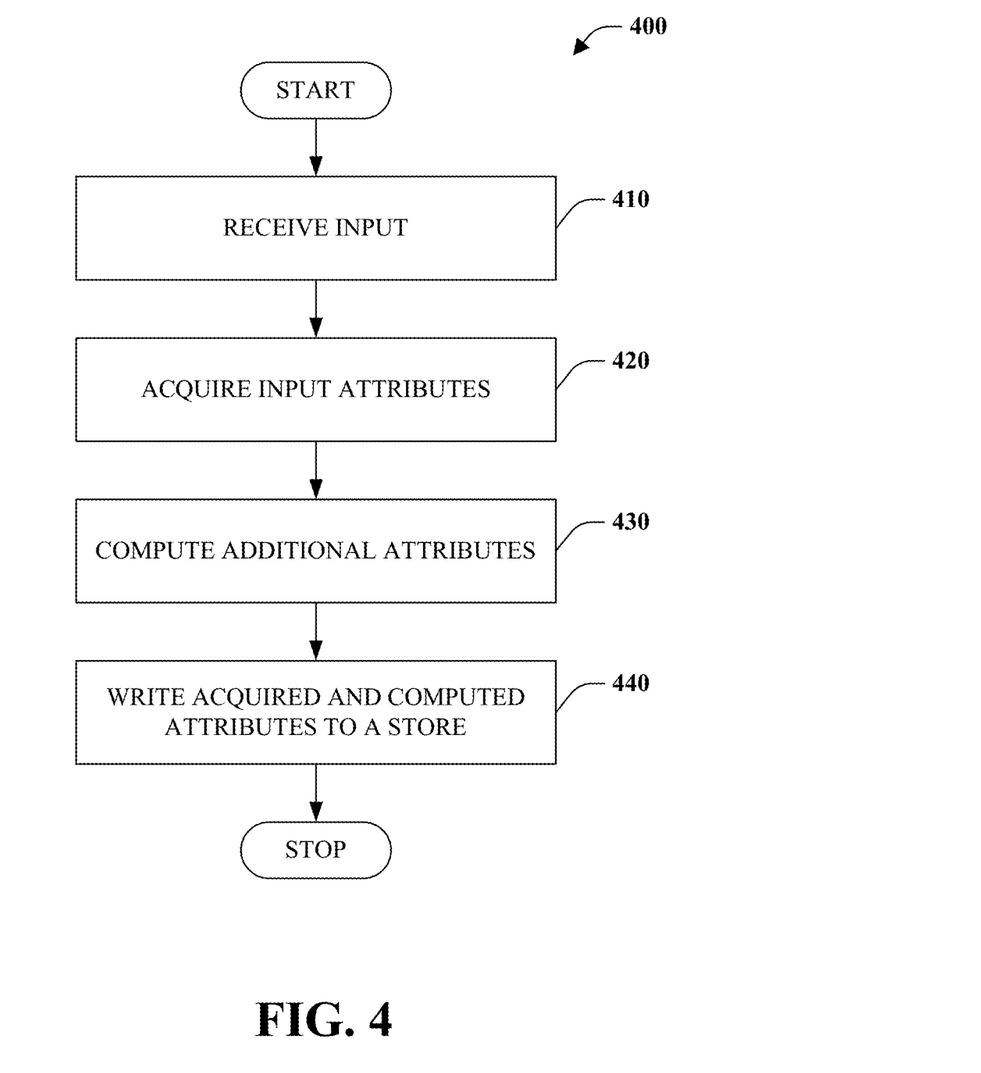
FIG. 4 is a flow chart diagram of a method of input processing.
Figure 5:
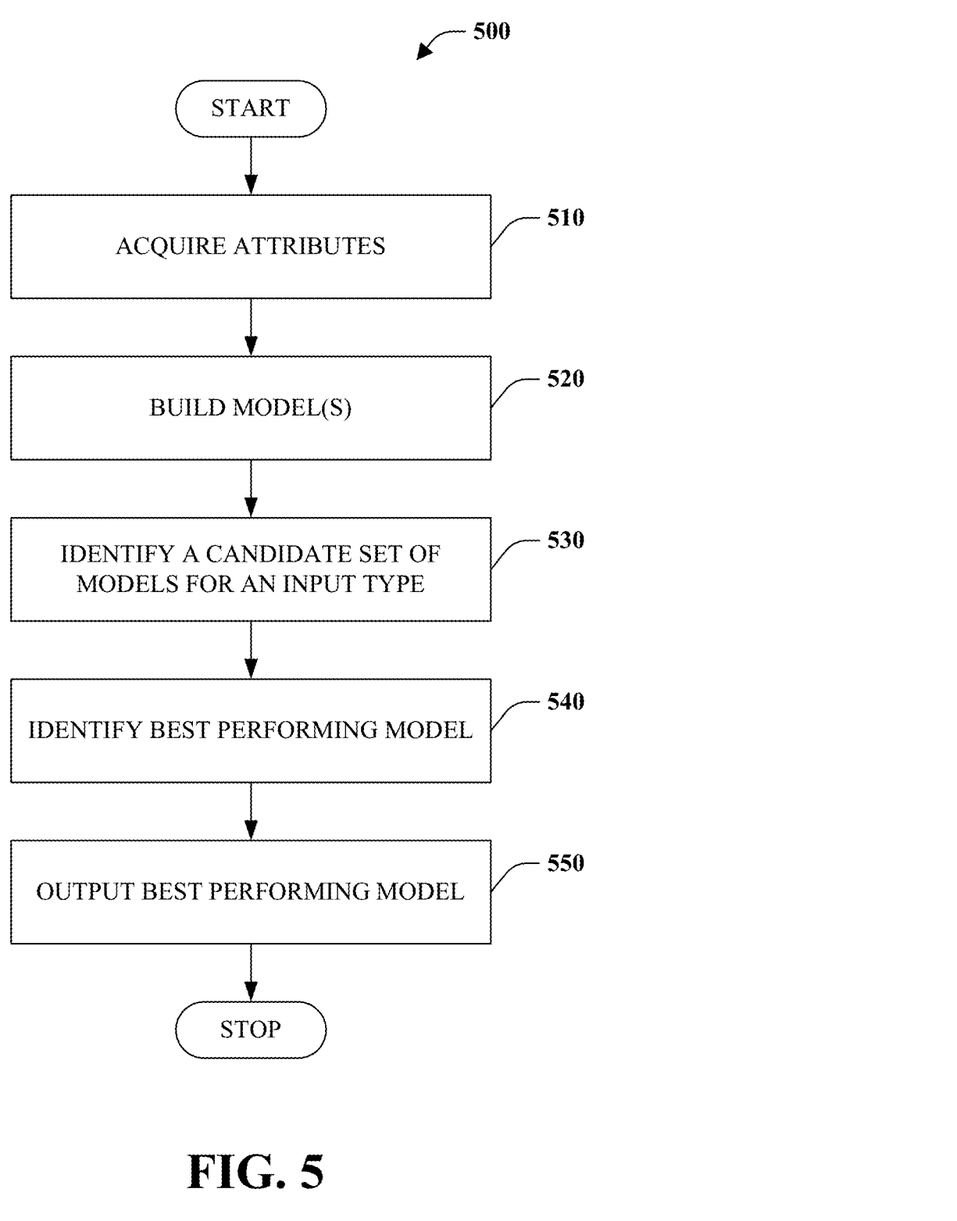
FIG. 5 is a flow chart diagram of method of model building.

In view of the exemplary systems described supra, methodologies that may be implemented in accordance with the disclosed subject matter will be better appreciated with reference to the flow charts of FIGS. 4 and 5. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described hereinafter.

Referring to FIG. 4, a method of input processing 400 is illustrated. At reference numeral 410, input is received, retrieved, or otherwise obtained or acquired for predictive processing. In one instance, the input can correspond to a transaction such as a purchase or addition of a credit card to an account in the fraud context. At numeral 420, attributes passed as part of the input can be acquired. For example, an attribute can be an IP (Internet Protocol) address or a device identifier, among other things. At numeral 430 additional attributes are computed or derived from acquired attributes. For instance, from an IP address a country can be identified.

Acquired and computed attributes are written or saved to a persistent store to enable later use in predictive model development and training.

FIG. 5 depicts a method 500 of model building. At reference numeral 510, acquired and/or computed attributes are received, retrieved, or otherwise obtained or acquired, for example from a persistent store. At numeral 520, one more models are built and/or trained based on the attributes. For example, in the case of a transaction, the transaction can be determined to be fraudulent or non-fraudulent automatically as a function of charge back data, customer support data, and/or manual review data, for instance. Attributes associated with the transaction can then be used as indicators of either a fraudulent or a non-fraudulent transaction, and embedded within a predictive model or set of algorithms to aid subsequent predictions. In accordance with one embodiment, a hierarchical model structure can be employed such that building a model comprises building and/or training a plurality of models for a particular input type across a number of levels of granularity. At numeral 530, a set of candidate models is identified for a particular type of input. The candidate set can include those models that that are hierarchically related for an input type. A best, or top, performing model can identified at numeral 540 as a function of one or more performance metrics. For example, performance of each model can be evaluated with respect to historical data, such that model that performs best with respect to historical data comparatively can be identified as the best performing model. At reference numeral 550, the best performing model can be output for subsequent use in real-time predictions.

The word "exemplary" or various forms thereof are used herein to mean serving as an example, instance, or illustration. Any aspect or design described herein as "exemplary" is not necessarily to be construed as preferred or advantageous over other aspects or designs. Furthermore, examples are provided solely for purposes of clarity and understanding and are not meant to limit or restrict the claimed subject matter or relevant portions of this disclosure in any manner. It is to be appreciated a myriad of additional or alternate examples of varying scope could have been presented, but have been omitted for purposes of brevity.

As used herein, the terms "component," and "system," as well as various forms thereof (e.g., components, systems, sub-systems . . . ) are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The conjunction "or" as used in this description and appended claims is intended to mean an inclusive "or" rather than an exclusive "or," unless otherwise specified or clear from context. In other words, "'X' or 'Y'" is intended to mean any inclusive permutations of "X" and "Y." For example, if "'A' employs 'X,'" "'A employs 'Y,'" or "'A' employs both 'X' and 'Y,'" then "'A' employs 'X' or 'Y'" is satisfied under any of the foregoing instances.

As used herein, the term "inference" or "infer" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action in connection with the claimed subject matter.

Furthermore, to the extent that the terms "includes," "contains," "has," "having" or variations in form thereof are used in either the detailed description or the claims, such terms are intended to be inclusive in a manner similar to the term "comprising" as "comprising" is interpreted when employed as a transitional word in a claim.

Figure 6:
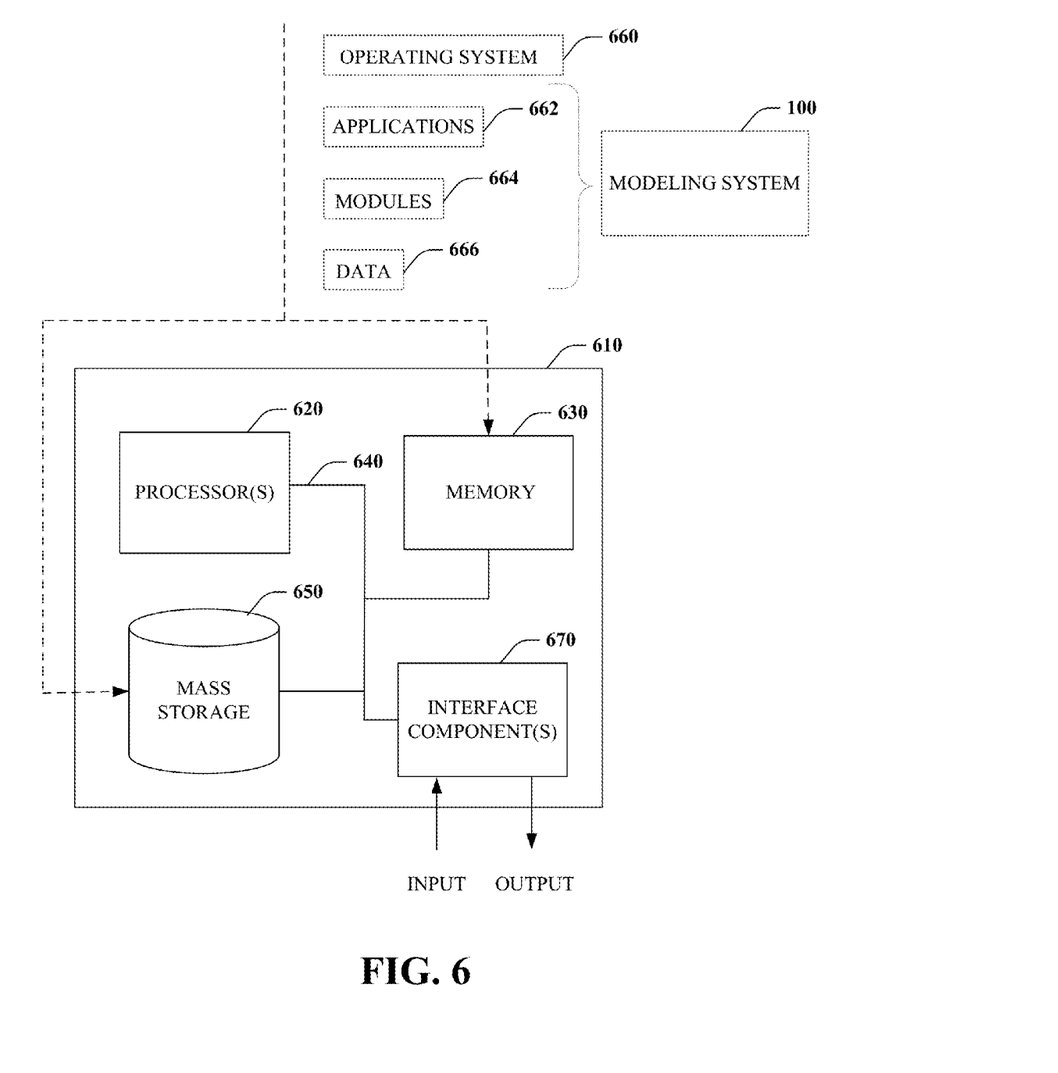
FIG. 6 is a schematic block diagram illustrating a suitable operating environment for aspects of the subject disclosure.

In order to provide a context for the claimed subject matter, FIG. 6 as well as the following discussion are intended to provide a brief, general description of a suitable environment in which various aspects of the subject matter can be implemented. The suitable environment, however, is only an example and is not intended to suggest any limitation as to scope of use or functionality.

While the above disclosed system and methods can be described in the general context of computer-executable instructions of a program that runs on one or more computers, those skilled in the art will recognize that aspects can also be implemented in combination with other program modules or the like. Generally, program modules include routines, programs, components, data structures, among other things that perform particular tasks and/or implement particular abstract data types. Moreover, those skilled in the art will appreciate that the above systems and methods can be practiced with various computer system configurations, including single-processor, multi-processor or multi-core processor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. Aspects can also be practiced in distributed computing environments where tasks are performed by remote processing devices that are linked through a communications network. However, some, if not all aspects of the claimed subject matter can be practiced on stand-alone computers. In a distributed computing environment, program modules may be located in one or both of local and remote memory storage devices.

With reference to FIG. 6, illustrated is an example general-purpose computer 610 or computing device (e.g., desktop, laptop, tablet, server, hand-held, programmable consumer or industrial electronics, set-top box, game system . . . ). The computer 610 includes one or more processor(s) 620, memory 630, system bus 640, mass storage 650, and one or more interface components 670. The system bus 640 communicatively couples at least the above system components. However, it is to be appreciated that in its simplest form the computer 610 can include one or more processors 620 coupled to memory 630 that execute various computer executable actions, instructions, and or components stored in memory 630.

The processor(s) 620 can be implemented with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. The processor(s) 620 may also be implemented as a combination of computing devices, for example a combination of a DSP and a microprocessor, a plurality of microprocessors, multi-core processors, one or more microprocessors in conjunction with a DSP core, or any other such configuration.

The computer 610 can include or otherwise interact with a variety of computer-readable media to facilitate control of the computer 610 to implement one or more aspects of the claimed subject matter. The computer-readable media can be any available media that can be accessed by the computer 610 and includes volatile and nonvolatile media, and removable and non-removable media. Computer-readable media can comprise computer storage media and communication media.

Computer storage media includes volatile and nonvolatile, removable and non-removable media implemented in any method or technology for storage of information such as computer-readable instructions, data structures, program modules, or other data. Computer storage media includes memory devices (e.g., random access memory (RAM), read-only memory (ROM), electrically erasable programmable read-only memory (EEPROM) . . . ), magnetic storage devices (e.g., hard disk, floppy disk, cassettes, tape . . . ), optical disks (e.g., compact disk (CD), digital versatile disk (DVD) . . . ), and solid state devices (e.g., solid state drive (SSD), flash memory drive (e.g., card, stick, key drive . . . ) . . . ), or any other like mediums which can be used to store the desired information and which can be accessed by the computer 610. Furthermore, computer storage media excludes signals.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 630 and mass storage 650 are examples of computer-readable storage media. Depending on the exact configuration and type of computing device, memory 630 may be volatile (e.g., RAM), non-volatile (e.g., ROM, flash memory . . . ) or some combination of the two. By way of example, the basic input/output system (BIOS), including basic routines to transfer information between elements within the computer 610, such as during start-up, can be stored in nonvolatile memory, while volatile memory can act as external cache memory to facilitate processing by the processor(s) 620, among other things.

Mass storage 650 includes removable/non-removable, volatile/non-volatile computer storage media for storage of large amounts of data relative to the memory 630. For example, mass storage 650 includes, but is not limited to, one or more devices such as a magnetic or optical disk drive, floppy disk drive, flash memory, solid-state drive, or memory stick.

Memory 630 and mass storage 650 can include, or have stored therein, operating system 660, one or more applications 662, one or more program modules 664, and data 666. The operating system 660 acts to control and allocate resources of the computer 610. Applications 662 include one or both of system and application software and can exploit management of resources by the operating system 660 through program modules 664 and data 666 stored in memory 630 and/or mass storage 650 to perform one or more actions. Accordingly, applications 662 can turn a general-purpose computer 610 into a specialized machine in accordance with the logic provided thereby.

All or portions of the claimed subject matter can be implemented using standard programming and/or engineering techniques to produce software, firmware, hardware, or any combination thereof to control a computer to realize the disclosed functionality. By way of example and not limitation, the modeling system 100, or portions thereof, can be, or form part, of an application 662, and include one or more modules 664 and data 666 stored in memory and/or mass storage 650 whose functionality can be realized when executed by one or more processor(s) 620.

In accordance with one particular embodiment, the processor(s) 620 can correspond to a system on a chip (SOC) or like architecture including, or in other words integrating, both hardware and software on a single integrated circuit substrate. Here, the processor(s) 620 can include one or more processors as well as memory at least similar to processor(s) 620 and memory 630, among other things. Conventional processors include a minimal amount of hardware and software and rely extensively on external hardware and software. By contrast, an SOC implementation of processor is more powerful, as it embeds hardware and software therein that enable particular functionality with minimal or no reliance on external hardware and software. For example, the modeling system 100 and/or associated functionality can be embedded within hardware in a SOC architecture.

The computer 610 also includes one or more interface components 670 that are communicatively coupled to the system bus 640 and facilitate interaction with the computer 610. By way of example, the interface component 670 can be a port (e.g., serial, parallel, PCMCIA, USB, FireWire . . . ) or an interface card (e.g., sound, video . . . ) or the like. In one example implementation, the interface component 670 can be embodied as a user input/output interface to enable a user to enter commands and information into the computer 610, for instance by way of one or more gestures or voice input, through one or more input devices (e.g., pointing device such as a mouse, trackball, stylus, touch pad, keyboard, microphone, joystick, game pad, satellite dish, scanner, camera, other computer . . . ). In another example implementation, the interface component 670 can be embodied as an output peripheral interface to supply output to displays (e.g., CRT, LCD, plasma . . . ), speakers, printers, and/or other computers, among other things. Still further yet, the interface component 670 can be embodied as a network interface to enable communication with other computing devices (not shown), such as over a wired or wireless communications link.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications, and variations that fall within the spirit and scope of the appended claims.

What is claimed is:

1. A method, comprising:
employing at least one processor configured to execute computer-executable instructions stored in a memory to perform the following acts:
constructing a hierarchical predictive model comprising multiple predictive models across multiple levels of granularity;
training each of the multiple predictive models based on accumulated data automatically at a predetermined interval;
evaluating performance of each of the multiple predictive models after the training; and
activating for use a root predictive model of the hierarchical predictive model and at least one child predictive model that outperforms a parent predictive model at a more specific level of granularity than the parent predictive model, wherein the parent predictive model is at an immediately preceding and more generic level in the hierarchy than the child predictive model.

2. The method of claim 1 further comprising predicting a probability of an outcome based on the hierarchical predictive model.

3. The method of claim 2, predicting a probability that a transaction is fraudulent.

4. The method of claim 1 further comprises acquiring attribute data related to a transaction.

5. The method of claim 4 further comprises deriving additional attribute data from the acquired attribute data.

6. The method of claim 1 further comprises employing a most specific predictive model that is active in the hierarchical predictive model and suited for a type of input request to predict an outcome.

7. The method of claim 1 further comprises constructing a data model with hierarchical levels including industry and merchant.

8. A system, comprising:
a processor coupled to a memory, the processor configured to execute the following computer-executable components stored in the memory:
a decision component that automatically predicts an outcome based on an input and a predictive model;
a model builder component that automatically trains multiple predictive models comprising a hierarchical predictive model across multiple levels of granularity based on accumulated data; and
a model selection component that activates for use to predict the outcome a root predictive model of the hierarchical predictive model and one or more child predictive model that outperforms a parent predictive model at a more specific level of granularity than the parent predictive model, wherein the parent predictive model is at an immediately preceding and more generic level in the hierarchy than the child predictive model.

9. The system of claim 8, the accumulated data comprises input attributes and attributes derived from the input attributes.

10. The system of claim 8, the decision component predicts a risk of fraud for an input transaction.

11. The system of claim 10, the input transaction is a purchase.

12. The system of claim 10, the multiple levels of granularity include industry, merchant, and product.

13. The system of claim 8, the decision component is a web-based service.

14. The system of claim 8 further comprises the decision component further predicts the outcome based on the input and a most specific predictive model that is active in the hierarchical predictive model and suited for a type of the input.

15. A computer-readable storage medium having instructions stored thereon that enable at least one processor to perform a method upon execution of the instructions, the method comprising:
receiving, by a processor, an input request for a prediction;
determining a type of the input request;
identifying a set of predictive models suited for the type of the input request from a hierarchy of predictive models;
selecting a best performing predictive model from the set of predictive models, wherein the best performing predictive model is an active predictive model at finest level of granularity in the set of predictive models; and
employing the best performing predictive model to predict an outcome in response the input request.

16. The computer-readable storage medium of claim 15, the method further comprises automatically retraining the hierarchy of predictive models at a predetermined interval based on accumulated data.

17. The computer-readable storage medium of claim 16, the method further comprises:
evaluating performance of the hierarchy of predictive models; and
activating for use one of the predictive models of the hierarchy of predictive models that outperforms a parent predictive model.

18. The computer-readable storage medium of claim 15, the method further comprises acquiring attribute data related to the input request.

19. The computer-readable storage medium of claim 15, the method further comprises receiving the input request from a web-based service.

20. The computer-readable storage medium of claim 15, the method further comprises predicting a probability that a transaction is fraudulent.

* * * * *